(12) United States Patent
Tanaami et al.

(10) Patent No.: US 9,075,479 B2
(45) Date of Patent: Jul. 7, 2015

(54) INPUT DEVICE AND METHOD USING AN OPTICAL TOUCH PANEL AND A CONTACT TOUCH PANEL

(75) Inventors: Yoshikane Tanaami, Isesaki (JP); Yoshiyuki Kawamata, Isesaki (JP)

(73) Assignee: SHOEI CO., LTD., Iseasaki-shi, Gunma (JP)

( * ) Notice: Subject to any disclaimer, the term of this patent is extended or adjusted under 35 U.S.C. 154(b) by 205 days.

(21) Appl. No.: 13/809,057

(22) PCT Filed: Jan. 13, 2011

(86) PCT No.: PCT/JP2011/050909
§ 371 (c)(1), (2), (4) Date: Jan. 8, 2013

(87) PCT Pub. No.: WO2012/008168
PCT Pub. Date: Jan. 19, 2012

(65) Prior Publication Data
US 2013/0106791 A1 May 2, 2013

(30) Foreign Application Priority Data

Jul. 13, 2010 (JP) .................. 2010-159195

(51) Int. Cl.
*G06F 3/042* (2006.01)
*G06F 3/044* (2006.01)
*G06F 3/045* (2006.01)

(52) U.S. Cl.
CPC .............. *G06F 3/042* (2013.01); *G06F 3/0425* (2013.01); *G06F 3/0428* (2013.01); *G06F 3/044* (2013.01); *G06F 3/045* (2013.01); *G06F 2203/04106* (2013.01)

(58) Field of Classification Search
CPC ................. G06F 3/041; G06F 3/042–3/0428; G06F 3/044–3/046; G06F 2203/04106
USPC ..................... 178/18.01, 18.03, 18.05–18.09; 345/156, 173–175
See application file for complete search history.

(56) References Cited

U.S. PATENT DOCUMENTS 6,498,602 B1 12/2002 Ogawa
2003/0071858 A1 4/2003 Morohoshi
(Continued)

FOREIGN PATENT DOCUMENTS

EP 1 100 041 A2 5/2001
JP 2001-56749 A 2/2001
(Continued)

OTHER PUBLICATIONS

International Search Report for PCT/JP2011/050909, mailing date of Apr. 26, 2011.
Extended European Search Report dated Feb. 3, 2014, issued in corresponding European application No. 11806501.0 (7 pages).

*Primary Examiner* — Nathan Danielsen
(74) *Attorney, Agent, or Firm* — Westerman, Hattori, Daniels & Adrian, LLP

(57) ABSTRACT

There is a conventional input device wherein a blind operation is easy because a touch panel type operation unit and a display unit are separately arranged at locations distant from each other, but such a conventional input device requires a camera for photographing a user's hand on the operation unit, and image processing for converting the photographed image of the hand and combining the image on the display unit, and thus, simplification of the processing method has been desired. Further, reducing the number of components used for such a device has been desired. Disclosed are an input device using a touch panel and an input method thereof, wherein the input device (1) which uses a touch panel is configured by an optical touch panel (3) provided with a touch-type touch panel (2), a retroreflection film (31) covering a surface of the touch-type touch panel (2), and a pair of detection units (34) located on the upper portions of the opposite ends of a side of the touch-type touch panel (2), and wherein two types of detection which are recognition of the shape of the operating body and detection of coordinate positions can be performed by the optical touch panel.

10 Claims, 9 Drawing Sheets

(56) References Cited

U.S. PATENT DOCUMENTS

2008/0211832 A1 9/2008 Kumon
2009/0309853 A1 12/2009 Hildebrandt et al.
2010/0328246 A1 12/2010 Cho
2011/0080363 A1* 4/2011 Kao et al. ............... 345/173

FOREIGN PATENT DOCUMENTS

| JP | 2003-173237 A | 6/2003 |
|---|---|---|
| JP | 2004-71233 A | 3/2004 |
| JP | 4389855 B2 | 12/2009 |

* cited by examiner

INPUT DEVICE AND METHOD USING AN OPTICAL TOUCH PANEL AND A CONTACT TOUCH PANEL

This application claims priority from Japanese Patent Application Number JP 2010-159195 filed on Jul. 13, 2010, the content of which is incorporated herein by reference in its entirety.

TECHNICAL FIELD

The present invention relates to an input device using touch panels including a contact touch panel and an optical touch panel having detectors and a retroreflective film provided on a surface of the contact touch panel, and to an input method for the input device.

BACKGROUND ART

Conventional input devices generally have a structure in which an input portion of a touch panel is disposed to overlie a display portion such as a display. When the operator directly touches an operation menu displayed on the display, a switch operation is performed on the input portion, and a desired menu is selected and executed.

One of such input devices is known to have a two-step switch constituted of a press-type input portion and an infrared-type input portion, and by reducing the number of press-inputting, the operation burden is relieved (refer to, for example, patent document 1).

Such an input device includes: display means configured to display an operation menu; a contact input-detection portion having an input-operation display on a display of the operation menu and configured to detect an input position where a pressure is applied; space input-detection portions disposed around the contact input-detection portion and configured to detect an object near the input-operation display; and a controller configured to control the display of the operation menu on the basis of a detection result of the space input-detection portion, and to execute selection affirmative processing on the operation menu on the basis of the input position detected by the contact input-detection portion.

The operator can select an operation item without touching the input-operation display of the contact input-detection portion, and thereby the number of operations performed on the contact input-detection portion is reduced, relieving the operation burden.

However, when the input device having a structure with the input portion and the display portion integrated is installed close to a hand of the operator, this causes a burden of moving of the sightline of the operator to the hand, and when installed at a position where the sightline of the operator needs to be moved less, this causes a burden of extending a hand of the operator to the display portion. For this reason, there is known an input device, which relieves the burdens by disposing an input portion and a display portion separately and apart from each other (refer to, for example, patent document 2).

Such an input device includes: a touch panel-type operating portion having an upper surface with operation switches arranged thereon on which an operation is performed with a hand of the operator; a display portion configured to display positions where the operation switches are arranged and an operation menu screen thereof; means configured to capture images of the operating portion and the hand of the operator from the above with a camera; means configured to superimpose and display the captured images on the operation menu screen; and means provided on the operating portion and configured to emit light to the entire operating portion.

An image of a hand on the operating portion captured by the camera is converted to an abstract image, which is superimposed on an operation menu image and displayed. Thereby, the operator can perform so-called blind operations, that is, switch operations performed while looking at the display portion but not directly looking at the input portion.

CITATION LIST

Patent Documents

Patent Document 1: Japanese Patent Application Publication No. 2004-71233
Patent Document 2: Japanese Patent No. 4389855

SUMMARY OF THE INVENTION

Problems to be Solved by the Invention

As described above, in the input device illustrated in patent document 1, the input portion having the same size as that of the display portion is disposed to overlie the display portion, and the operator makes a selection by bringing a finger close to the display portion. Accordingly, the finger of the operator itself plays a role of a pointer. In other words, a position pointed by the operator and a position selected on the operation menu screen of the display portion correspond to each other on a one-to-one basis. Thus, it is easy for the operator to intuitively see and it is not necessary to display a pointer or the like on the operation menu screen. Hence, this makes it difficult to dispose the input portion and the display portion separately and apart from each other.

In order to dispose the input portion and the display portion separately, it is necessary that a position pointed with a finger or the like on the input portion be visually checkable by the operator through the display portion. In the device which originally has such a structure that the display portion and the input portion are overlaid on each other and a finger of the operator is used as a substitute of a pointer or the like, there is a problem that the two cannot be separated.

Meanwhile, the input device illustrated in patent document 2, the display portion and the operating portion are disposed separately and apart from each other. Hence, it is necessary that the operator be able to perform an operation while looking at the operation menu screen of the display portion. The camera for capturing images of the operating portion and a hand of the operator, processing of extracting the captured image of the hand, superimposing and displaying the image on the operation menu screen, and so forth make it difficult to reduce the number of components of the input device and to simplify the processing method.

Moreover, in order to make blind operations possible, it is necessary to extract a hand image captured with the camera, and compute and superimpose relative positions between an actual position of the hand on the operating portion and the position of each operation switch. There is a problem of high cost because an expensive camera requiring image processing is used.

Further, when images are captured with the camera, if the operating portion is not irradiated with a light source such as an LED, it is hard to capture images in an environment in which sunlight or the like enters, or in an environment in which there is insufficient lighting such as at night. This brings about another problem that a hand on the operating portion cannot be accurately recognized. For this reason, it has been sought to recognize an operating object on an operating portion without being influenced by an environment.

In addition, it has been desired that the size of an operating portion can be altered freely according to the use and the shape of an input device such as an automotive navigation system and remote controls of home appliances.

Means for Solving the Problem

The present invention has been made in view of the above-described conventional problems. Firstly, the present invention comprises: a contact touch panel; and an optical touch panel including a retroreflective film provided to cover a surface of the contact touch panel, and a pair of detectors each constituted of a light emitter and a light receiver and respectively located above both ends of one side of the contact touch panel. An operating object, such as a hand, placed on the retroreflective film is irradiated light from the light emitters obliquely thereabove, the light receivers detect reflected light from the retroreflective film exposed at the operating object, and a shape of the operating object is distinguished and recognized. The detectors detect incident angles at a position of an operating object, such as a finger, moved on the retroreflective film to obtain coordinates of the operating object according to a principle of triangulation. Input information is affirmed by touching the contact touch panel.

Moreover, in the present invention, the contact touch panel and the optical touch panel are covered with a light shielding cover, and the operating object is placed through an opening provided on one side of the light shielding cover.

Further, in the present invention, a resistive film type touch panel or a capacitive touch panel is used as the contact touch panel.

Furthermore, in the present invention, a light emitting diode is used as the light emitters of the detectors of the optical touch panel, and a CMOS sensor is used as the light receivers.

Secondly, the present invention is an input method for an input device using touch panels comprising: a contact touch panel; and an optical touch panel including a retroreflective film provided to cover a surface of the contact touch panel, and a pair of detectors each constituted of a light emitter and a light receiver and respectively located above both ends of one side of the contact touch panel, the input device used for inputting by operating a cursor displayed on a display panel provided at a position apart from the input device. The input method comprises: irradiating an operating object, such as a hand, placed on the retroreflective film with light from the light emitters of the optical touch panel obliquely thereabove, causing the light receivers to detect reflected light from the retroreflective film exposed at the operating object, causing a microcontroller to distinguish a shape of the operating object, and selecting one of multiple display modes displayed on the display panel according to a shape-recognition signal from the microcontroller; next, in the selected display mode, causing the detectors to detect incident angles at a position of an operating object, such as a finger, moved on the retroreflective film of the optical touch panel, and to input the incident angles into the microcontroller to obtain coordinates of the operating object according to a principle of triangulation, transferring a coordinate signal to the display panel, and moving the cursor to an operation selection region on the display panel according to the coordinate signal; and touching the contact touch panel at a position of the cursor in the selected operation selection region to thereby output an affirmative signal from the microcontroller for operation of the selected display mode.

Moreover, in the present invention, the shape of the operating object is distinguished by the number of fingers, and one of the multiple display modes displayed on the display panel is selected according to the shape-recognition signal from the microcontroller.

Advantageous Effects of Invention

Firstly, the input device using touch panels of the present invention comprises: a contact touch panel; and an optical touch panel including a retroreflective film covering the surface of the contact touch panel and a pair of detectors located above both ends of one side of the contact touch panel. In other words, an input device can be completed only with touch panels.

Moreover, the detectors of the optical touch panel each include a light emitter using a light emitting diode and a light receiver using a CMOS sensor. Accordingly, the light receivers can detect an incident direction of light emitted from the light emitters toward the retroreflective film and then reflected and returned therefrom.

Hence, since the light receivers detect the shadows of the irradiation light and the reflected light blocked by an operating object, such as a finger, on the retroreflective film, coordinates of the operating object are obtained on the basis of the incident angles of the shadow and according to the principle of triangulation. Moreover, since the operating object is irradiated with light obliquely thereabove and the entire surface of the operating object is irradiated with the light, the shape of the operating object can be recognized.

As a result, this eliminates the need for processing required for conventional input devices, such as processing of capturing images of an input area and a hand of the operator with a camera, processing of recognizing the shape of the hand from the captured images, and processing of detecting coordinates on the basis of relative positions between the captured images and the display screen. Accordingly, a camera is no longer required in the input device.

Herein, the retroreflection refers to a property that when light is reflected, the reflected light returns at the same angle as the incident angle of the light. In the present invention, a film made from a retroreflective member is called a retroreflective film.

From the above, it is no longer necessary to secure a camera-installation area, a focal distance between a camera and an object, and so forth. The touch panels alone enables both recognition of the shape of an operating object and detection of the coordinates of the operating object, producing effects leading to size and thickness reductions of the input device.

Secondly, according to the input device using touch panels of the present invention, the optical touch panel includes a retroreflective film and a pair of detectors.

An infrared scanning-type touch panel is available as another type of the optical touch panel. In such a type, however, multiple light-emitting and light-receiving elements have to be disposed on sides facing each other. The number of light-emitting and light-receiving elements disposed on one side needs to be increased or decreased depending on the resolution of coordinates to be detected. The resolution becomes higher as the number of elements increases.

Thus, in comparison with an infrared scanning-type touch panel, the optical touch panel of the present invention requires only a pair of detectors, and high-resolution coordinates can be detected only with two light emitters and two light receivers. Thus, there is an effect of greatly reducing the number of components.

As a result, the size of the touch panels can be selected freely without changing the number of components.

In addition, since the size of the input device and the size of the display can be selected freely, it is possible to make the size of the input device smaller than the size of the display according to the application and form of the input device in use. The input device can be designed more freely, and this effect improves the design characteristics.

Thirdly, according to the input device using touch panels of the present invention, the contact touch panel and the optical touch panel are covered with a light shielding cover. Accordingly, an incidence of external light such as sunlight can be prevented. This prevents an unintended operation due to an incidence of sunlight on the retroreflective film. Thus, the input device can be utilized without being influenced by an environment.

Fourthly, according to the input method for an input device using touch panels of the present invention, reflected light from the retroreflective film is detected, the microcontroller can distinguish the shape of an operating object. This makes it possible to establish correspondences between the shape of an operating object and multiple display modes displayed on the display panel.

Accordingly, after the power source of the input device is turned on, it is only necessary for the operator to cause the input device to detect predetermined shapes such as one finger and two fingers. A desired screen mode can be selected and displayed on the display panel without looking at the display.

As a result, it is not necessary to display a mode selection screen for selection of a screen mode after the power source is turned on. Moreover, an operation to select a desired button switch on the mode selection screen can also be omitted.

Fifthly, according to the input method for an input device using touch panels of the present invention, the coordinates of an operating object, such as a finger, moved on the retroreflective film is detected, and the cursor which moves according to the coordinate signal can be displayed on the display panel. This makes it possible to install the display panel at a position apart from the input device. Moreover, the operator can perform an operation by looking at only the display panel.

Sixthly, according to the input device using touch panels of the present invention, if a scratch or the like is made on the surface of the contact touch panel during the production process even slightly, such a scratch can be hidden by pasting the retroreflective film on the surface of the contact touch panel. Further, covering with the retroreflective film protects the contact touch panel from a scratch, also. This greatly reduces the number of failure products, and can eliminate waste of resources.

DESCRIPTION OF EMBODIMENTS

Figure 1:
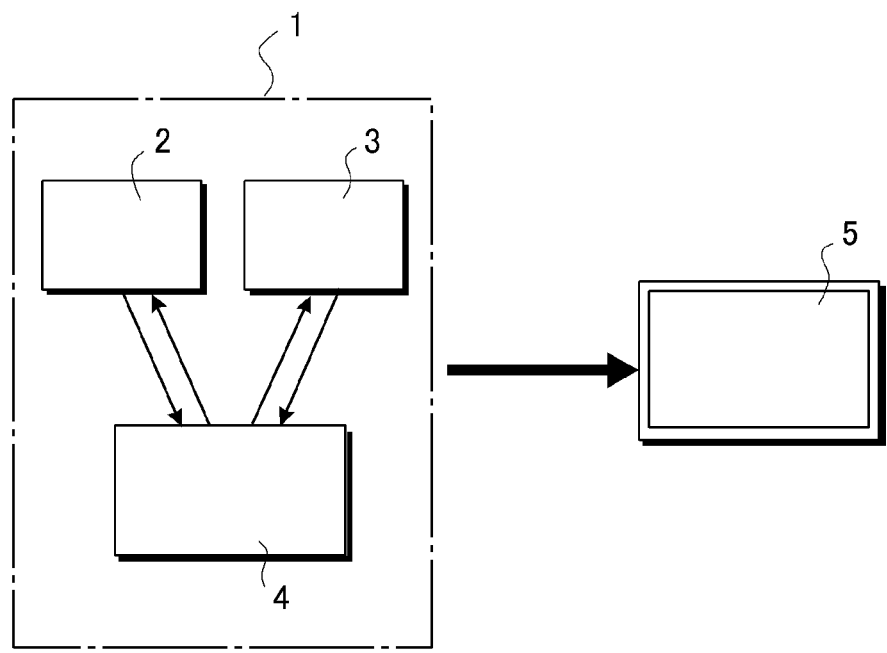
FIG. 1 is a block diagram for describing an input device using touch panels of the present invention.
Figure 2:
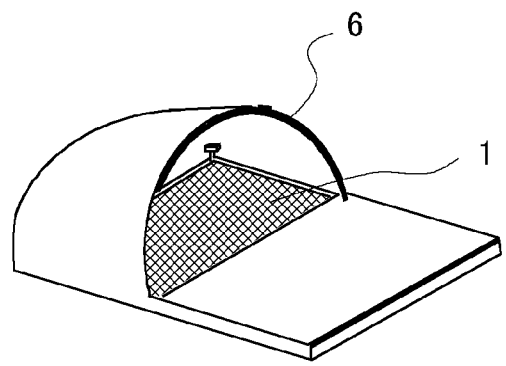
FIG. 2 is a perspective view for describing a light shielding cover configured to cover the input device of the present invention.

FIG. 1 is a block diagram for describing an input device using touch panels of the present invention. FIG. 2 is a perspective view for describing a light shielding cover configured to cover the input device of the present invention.

As shown in FIG. 1, an input device 1 using touch panels of the present invention includes a contact touch panel 2, an optical touch panel 3, and a microcontroller 4.

The contact touch panel 2 is a touch panel having a transparent conductive film 23 (refer to FIG. 3) formed between an upper substrate 21 (refer to FIG. 3) and a lower substrate 22 (refer to FIG. 3). The operator performs inputting by touching the upper substrate 21. A glass plate, film, or the like is used as the upper substrate or the lower substrate, and an ITO film or the like is used as the transparent conductive film.

Specifically, as the contact touch panel 2, a resistive film type touch panel or a capacitive touch panel is used.

The resistive film type touch panel is a touch panel having a glass-glass structure or a film-glass structure. In such structures, transparent conductive films 23 are formed on one surfaces of an upper substrate 21 and a lower substrate 22 each made of a glass plate or film. The transparent conductive films 23 face each other with dot spacers disposed therebetween. When the operator pushes down the upper substrate, the transparent conductive film of the upper substrate is electrically connected to the transparent conductive film of the lower substrate at a position where no dot spacer exists. A coordinate position is determined by measuring the voltage at the X axis and the Y axis of the pushed position.

The capacitive touch panel has a structure in which a transparent conductive film 23 is formed on a lower substrate 22 such as a glass or a plastic, and is over-coated with an upper substrate 21 such as a film or a plastic. When the operator touches, the capacitance changes between the finger tip and the transparent conductive film, and the change is utilized to detect a coordinate position.

The optical touch panel 3 is a touch panel formed from: a retroreflective film 31 (refer to FIG. 3); and a pair of detectors 34 (refer to FIG. 3) each constituted of a light emitter 32 configured to irradiate the retroreflective film with light and a light receiver 33 configured to receive reflected light therefrom. The optical touch panel 3 recognizes the shape of an operating object, such as a hand of the operator, placed on the retroreflective film, and detects the coordinate position of an operating object such as a finger of the operator. Note that the specific details will be described with FIG. 3.

The microcontroller 4 is a controller configured to receive signals generated by the contact touch panel 2 and the optical touch panel 3, and to have an arithmetic function and a data processing function such as generating a coordinate signal on the basis of an incident angle detected by the optical touch panel and according to the principle of triangulation, moving a cursor corresponding to the coordinate signal on a display panel 5.

The display panel 5 is a display such as a liquid crystal display or an organic EL display, which displays multiple display modes and a cursor for controlling the display modes. The display panel 5 is installed at a position apart from the input device 1 using touch panels.

Next, FIG. 2 shows one example of a light shielding cover configured to cover the input device using touch panels of the present invention.

The light shielding cover 6 is formed to have an opening provided on one side thereof and is configured to cover the contact touch panel 2 and the optical touch panel 3 and to prevent an unintended operation due to an incidence of external light such as sunlight.

As shown in the drawing, the touch panel-type input device 1 is disposed on a support base, and the light shielding cover 6 in a dome-like shape surrounds a position where the contact touch panel and the optical touch panel are located. The opening is a site where an operating object, such as a hand or a finger of the operator, is placed for operation. The opening needs to have a certain height for a sufficient operability.

Figure 3A:
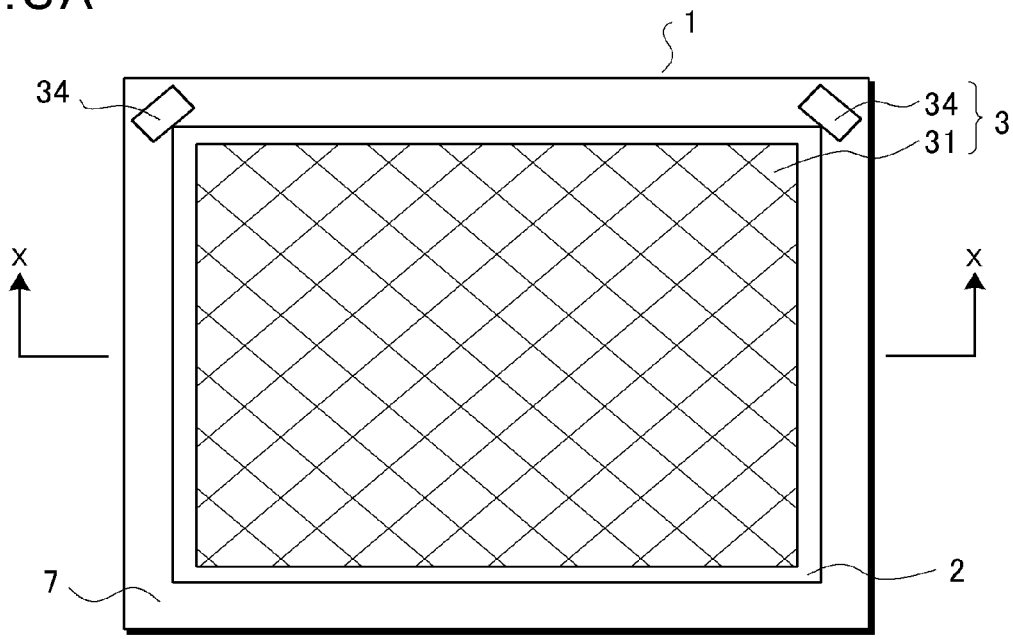
FIG. 3A is a top view for describing the input device using touch panels of the present invention, B is a cross-sectional view thereof, and C is a view showing the light irradiation range of detectors.
Figure 3B:
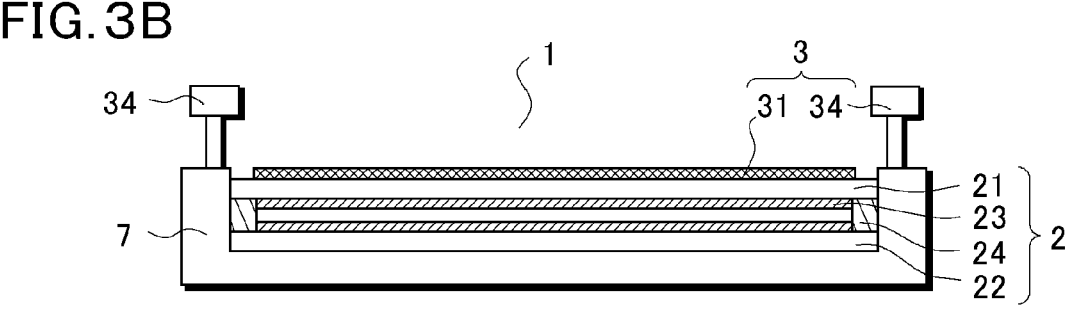
Figure 3C:
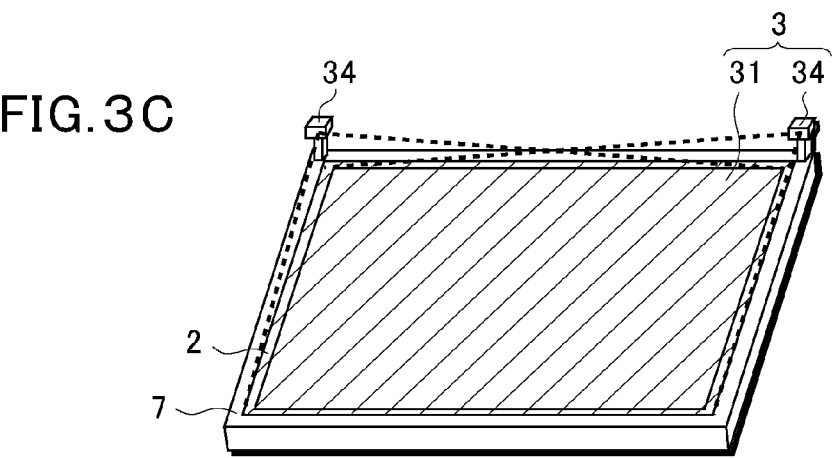

Further, a specific structure of an input device 1 using touch panels of the present invention will be described using FIG. 3. FIG. 3A is a top view of the input device 1 of the present invention, FIG. 3B is a cross-sectional view thereof, and FIG. 3C is a view showing the light irradiation range of detectors. Note that, here, the description will be given of an example where a resistive film type touch panel is used as a contact touch panel.

As shown in FIG. 3A, a contact touch panel 2 is provided in a casing 7 in the form of a frame having an upper surface opened. The casing 7 supports the contact touch panel 2, protects the touch panel from an external force, and has a role of a support base where detectors 34 of an optical touch panel 3 are disposed.

Next, the optical touch panel 3 characteristic of the present application is formed from: a retroreflective film 31; and a pair of the detectors 34 constituted of a light emitter 32 (unillustrated) configured to irradiate the retroreflective film with light and a light receiver 33 (unillustrated) configured to receive reflected light therefrom.

The retroreflective film 31 is provided to cover the entire surface of an operation selection region of the contact touch panel 2 to be touched.

The pair of detectors 34 are provided respectively on both ends of one side of the contact touch panel 2 and located higher than a surface of the contact touch panel 2. Since the detectors have to be disposed with a certain strength, the detectors should be provided on the casing 7 side. The detectors 34 are each constituted of the unillustrated light emitter 32 and light receiver 33. Thus, the retroreflective film 31 is irradiated with infrared light from the light emitter 32 located obliquely thereabove, and the light is reflected by the retroreflective film 31 and returned to the light receiver 33.

The cross-sectional view of FIG. 3B corresponds to a portion indicated by the X-X line in FIG. 3A. As shown in the drawing, a resistive film type touch panel having a glass-glass structure or a film-glass structure is used as the contact touch panel 2.

In the contact touch panel 2, ITO films 23 are formed on one surfaces of an upper substrate 21 and a lower substrate 22. A transparent electrode, a leading electrode, and an external extraction electrode (unillustrated) patterned by photo etching are formed. Moreover, the transparent electrodes of the upper substrate 21 and the lower substrate 22 are overlaid in such a manner as to face each other, the upper and the lower substrates are pasted with an adhesive layer 24 provided at peripheral edge portions of the substrates. Note that in order to keep a space between the upper and the lower substrates, a number of unillustrated dot spacers are disposed on one of the glass substrates.

When any point on the operation selection region of the contact touch panel 2 to be touched is pressed with a finger, a pen, or the like, the transparent electrode of the upper substrate and the transparent electrode of the lower substrate are brought into contact with each other and brought into an on-state at the point. This turn-on signal is sent to a microcontroller 4 through each of the leading electrode and the external extraction electrode, and processing corresponding to the turn-on signal is performed.

Note that when the pressing is released, the transparent electrode of the upper substrate and the transparent electrode of the lower substrate are separated from each other and brought into an off-state. The processing corresponding to the turn-on signal is ended.

The optical touch panel 3 has the retroreflective film 31 pasted on a surface of the contact touch panel 2 with an adhesive, the retroreflective film 31 having approximately the same size as that of the operation selection region to be touched. Moreover, when the contact touch panel 2 is pressed, the retroreflective film 31 is simultaneously pressed. For this reason, a protection sheet (unillustrated) for protection from dirt and scratch is pasted on the surface of the retroreflective film 31. Furthermore, the pair of detectors 34 are fixed to the strong casing 7 side with an adhesive, and respectively located above both ends of one side of the contact touch panel. A light emitting diode is used as the light emitter 32, and a CMOS sensor is used as the light receiver 33.

The optical touch panel 3 utilizes retroreflective properties that when irradiation light from the light emitter 32 hits the retroreflective film 31, the light returns straightly at the same incident angle as that of the irradiation light. When an operating object such as a hand, a finger, or a pen is placed on the retroreflective film 31, the irradiation light is blocked at the portion, and the light receiver 33 detects it as a shadow. The pair of detectors 34 detect this shadow, and detect the shape of the operating object and the coordinate position.

Specifically, the coordinate position of the operating object is detected on the basis of two incident angles and according to the principle of triangulation. The coordinate signal is sent to the microcontroller 4, and a cursor can be displayed on a display panel 5.

Moreover, when multiple opened or closed fingers are placed on the retroreflective film 31, the light receivers detect the number of shadows of the irradiation light irradiated from the light emitters obliquely above the retroreflective film 31, and the microcontroller 4 distinguishes the shape of the operating object. The microcontroller 4 generates a shape-recognition signal, and one selected from multiple display modes can be displayed on the display panel.

The present invention is characterized in that the single optical touch panel 3 has a function of performing the above-described two kinds of detections.

FIG. 3C shows the range where the light emitters 32 of the detectors 34 can emit infrared light. As shown in the drawing, it can be seen that the operation selection region of the contact touch panel 2 to be touched is irradiated with infrared light because the retroreflective film 31 is irradiated by the light emitters 32 located thereabove.

Accordingly, a shadow portion of an operating object can be eliminated, enabling more accurate shape recognition.

Figure 4:
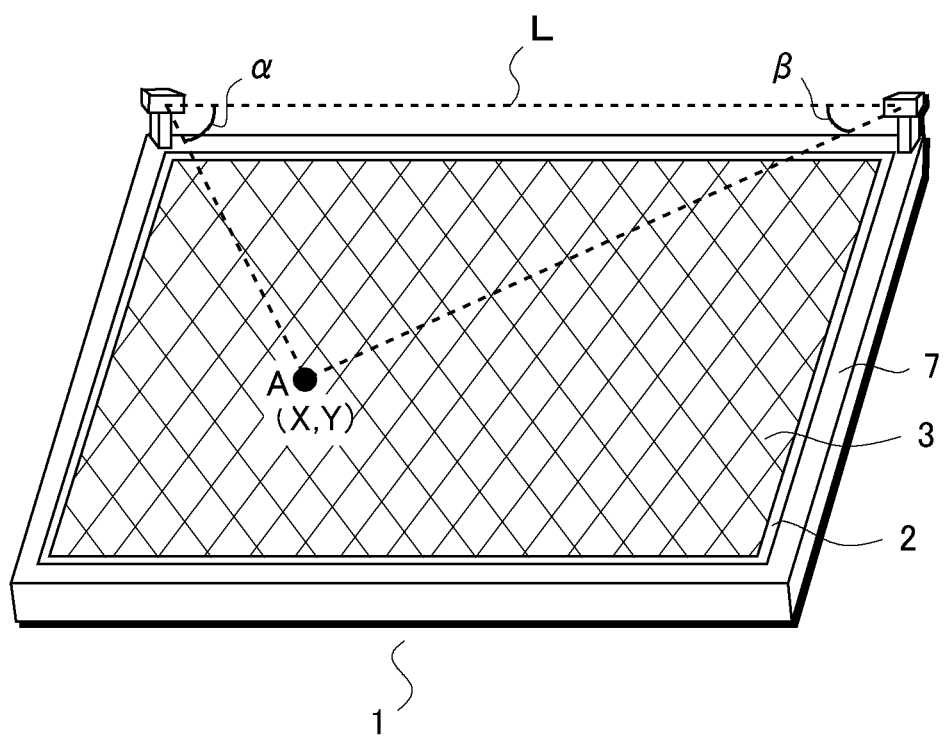
FIG. 4 is a view for describing a method for detecting a coordinate position according to the principle of triangulation of the present invention.
Figure 5A:
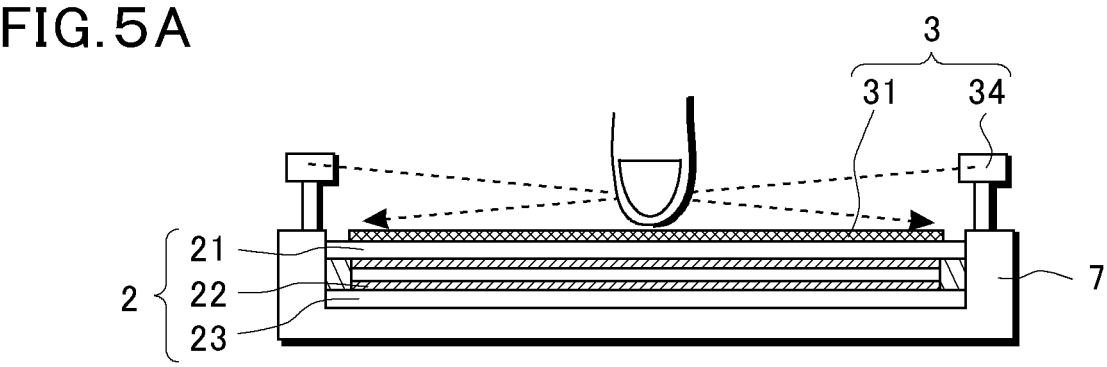
FIGS. 5A and B are a view and a graph for describing a method for detecting the coordinate position of an operating object, such as a finger, by an optical touch panel of the present invention.
Figure 5B:
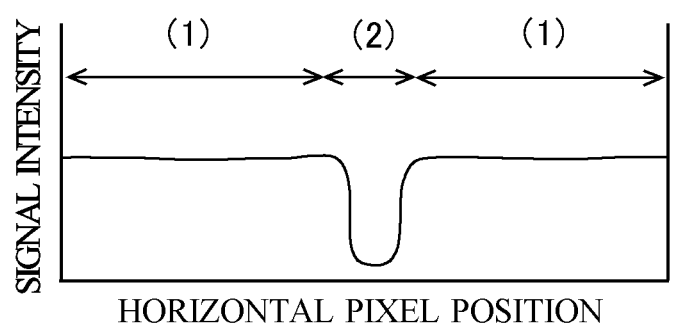

Next, a detecting method of an optical touch panel will be described using FIGS. 4 to 6. FIG. 4 is a view for describing a method for detecting a coordinate position according to the principle of triangulation. FIGS. 5A and 5B are a view and a graph for describing the method for detecting the coordinate position of an operating object, such as a finger, by the optical touch panel. FIGS. 6A to 6D are a view and graphs for describing a method for recognizing the shape of an operating object, such as a hand, by the optical touch panel.

An X coordinate and a Y coordinate of an operating object A on a retroreflective film 31 are obtained as shown in FIG. 4.

When the position of a detector on a left side is set as the origin and the coordinates of an operating object are set as (X, Y), a direction to a detector on a right side is the X axis, and a direction orthogonal thereto is the Y axis.

In addition, the following relational expressions are established:

$$\tan \alpha = Y/X \quad (1)$$

$$\tan \beta = Y/(L-X) \quad (2)$$

where α, β are respectively incident angles between one side of the contact touch panel and shadows detected by the detectors 34 disposed at two positions of the contact touch panel; and L is a distance between the right and left detectors 34. X is obtained according to the formulas (1) and (2)

from (1), $Y = X \tan \alpha$, and from (2), $Y = (L-X) \tan \beta$ $$\therefore X = (L \tan \beta)/(\tan \alpha + \tan \beta) \quad (3).$$

Thus, the coordinates (X, Y) of the operating object A can be calculated on the basis of the detected angles α, β and according to the formulas (1) and (3).

Moreover, FIG. 5A is a view for describing a method for recognizing the shape by the optical touch panel and FIG. 5B is a graph for describing the signal strength.

As shown in FIG. 5A, when the operator places one finger on the retroreflective film 31, the two detectors emit light, and the light receivers detect a portion where the finger is located as a shadow. In the light receivers, detection as shown in FIG. 5B is performed.

In the graph, (1) between two arrow signs is a signal strength representing a state where no operating object is present at all on the retroreflective film. Since there is no operating object, irradiated light is totally reflected, hence forming a horizontal line to a horizontal pixel position.

Note that the signal strength illustrated is corrected for the initial value.

Meanwhile, (2) between two arrow signs in the graph is a signal strength representing a state where an operating object is present on the retroreflective film. Since a shadow from the operating object is detected, the signal strength is weakened while the shadow is detected.

Utilizing these, the shape of an operating object can be distinguished.

Herein, the horizontal pixel position indicates the position of a shadow appearing on a side located horizontally to the detectors.

Figure 6A:
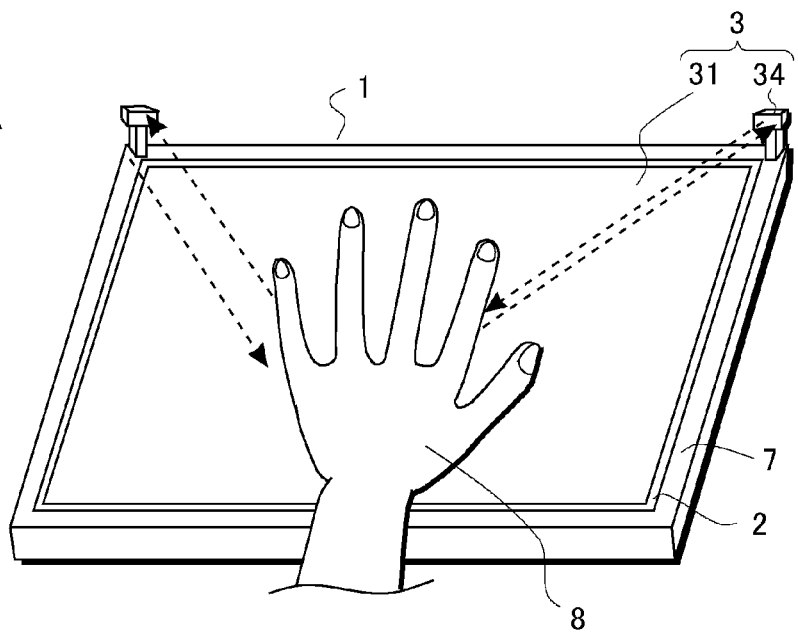
FIGS. 6A to D are a view and graphs for describing a method for recognizing the shape of an operating object, such as a hand, by the optical touch panel of the present invention.

As shown in FIG. 6A, by disposing the detectors 34 above a surface of the retroreflective film 31 and by placing an operating object 8 on the retroreflective film 31, it is made possible to irradiate the operating object entirely with infrared light obliquely thereabove. Hence, the operating object hardly has a shadow.

However, when adjacent operating objects are close to each other, the operating objects overlap each other depending on the irradiation direction, and are inevitably recognized as one operating object. To eliminate this, the pair of detectors 34 are provided on both ends of one side of the contact touch panel 2, and graphs of signal strengths detected by the respective detectors are superimposed to enhance the accuracy of the detection result.

In this manner, even when an operating object such as a hand is disposed, the number of fingers can be detected.

Figure 6B:
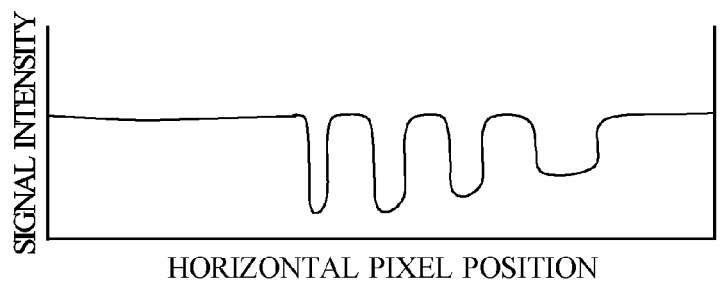

FIG. 6B shows the signal strength detected by the light receiver on the left side in FIG. 6A. Since an operating object, such as a hand, is irradiated from the little finger side, four shadows of the little finger, the ring finger, the middle finger, and the index finger appear. In this event, the thumb is in the shadow of the index finger and located far away from the light emitter. Accordingly, the index finger has a wide shadow with respect to the horizontal pixel position, and the signal strength weakly appears.

Figure 6C:
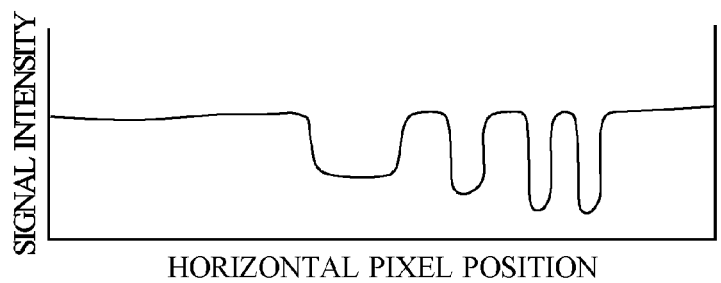

Meanwhile, FIG. 6C shows the signal strength detected by the light receiver on the right side in FIG. 6A. In this case, since the thumb side is irradiated first, four shadows of the thumb, the index finger, the middle finger, and the ring finger appear. Similarly to the above, the little finger is in the shadow of the ring finger and located far away from the light emitter. Accordingly, the ring finger has a wide shadow with respect to the horizontal pixel position, and the signal strength weakly appears.

Figure 6D:
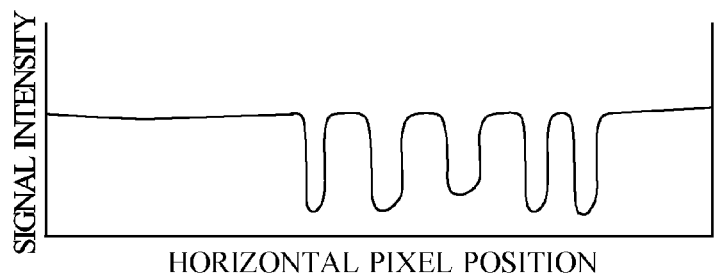

Next, as shown in FIG. 6D, a microcontroller 4 superimposes these detection results. As shown in the graph, it can be seen that when five fingers are opened on the retroreflective film 31, the number of shadows present corresponds to the number of the five fingers. This is done by the detectors 34 at two positions, and the superimposition of these results enables accurate recognition. As a result, the number of fingers can be distinguished.

Thus, by locating the detectors 34 above the retroreflective film 31 by approximately 30 mm to 100 mm from the surface, the operating object can be irradiated entirely with infrared light. The upward height of the detectors 34 should be selected within the range that allows irradiation of an entire operating object.

As described above, the microcontroller 4 recognizes the number of fingers and generates a shape-recognition signal.

The shape-recognition signal is a signal for controlling displaying of a display panel through selection of the number of display modes, which respectively correspond to the numbers of fingers recognized.

Figure 7:
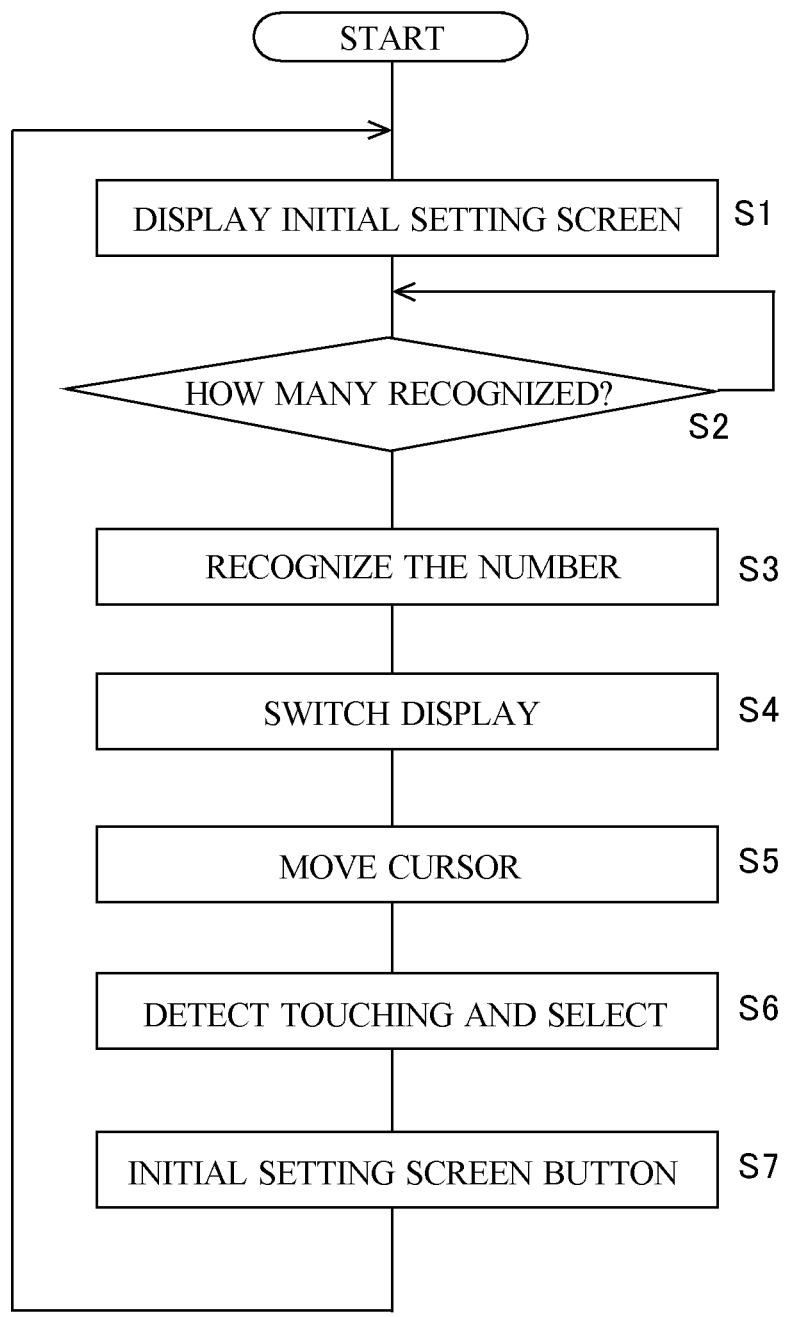
FIG. 7 is a flowchart for describing an input method for an input device using touch panels of the present invention.

Next, an input method for an input device using touch panels of the present invention will be described using FIG. 7.

When the power source of an input device 1 using touch panels is turned on, an initial setting screen is displayed on a display panel 5 provided apart from the input device (step S1).

Then, an operating object, such as a hand, placed on a retroreflective film 31 is irradiated with light from light emitters 32 of an optical touch panel 3 obliquely thereabove. Light receivers 33 detect reflected light from the retroreflective film 31 exposed at the operating object. A microcontroller 4 distinguishes the shape of the operating object and recognizes the shape (step S2).

Note that in this event, the irradiation is performed multiple times at certain intervals. The shape of the operating object is recognized, only when all the detected values of the reflected light are the same. Specifically, the processing in step S2 is successively performed three times at 1-second intervals. Thereby, it can be recognized that the screen mode is selected by the will of the operator, which can be distinguished from a case where an operating object, such as a hand, a sleeve of clothing, or the like is accidentally placed on the optical touch panel.

Subsequently, one of multiple display modes displayed on the display panel 5 is selected according to the shape-recognition signal from the microcontroller 4 (step S3).

Thereafter, the display mode is switched and displayed on the display panel 5 (step S4).

After that, in the displayed display mode, detectors detect incident angles at the position of an operating object, such as a finger, moved on the retroreflective film 31 of the optical touch panel 3 and input the incident angles into the microcontroller 4 to obtain the coordinates of the operating object according to the principle of triangulation. The microcontroller 4 transfers a coordinate signal of the coordinates to the display panel, and moves a cursor in an operation selection region on the display panel according to the coordinate signal (step S5).

Then, at a position of the cursor in the selected operation selection region, the contact touch panel 2 is touched through the retroreflective film 31. Thereby, the microcontroller 4 outputs an affirmative signal for operation of the selected display mode (step S6).

Subsequently, in a case of switching to another display mode, an initial setting screen button is selected to terminate the current display mode and display the initial setting screen in step S1 (step S7). Thereafter, the processing is returned to step S1 by the microcontroller 4, and the operator performs an operation to recognize an operating object such as a hand.

Note that, instead of step S7, the processing to directly return to step S1 may be executed in a case where no operation is executed for a certain period after step S6.

Now, Examples will be described in which an input device using touch panels of the present invention is utilized for an automotive navigation system.

Figure 8:
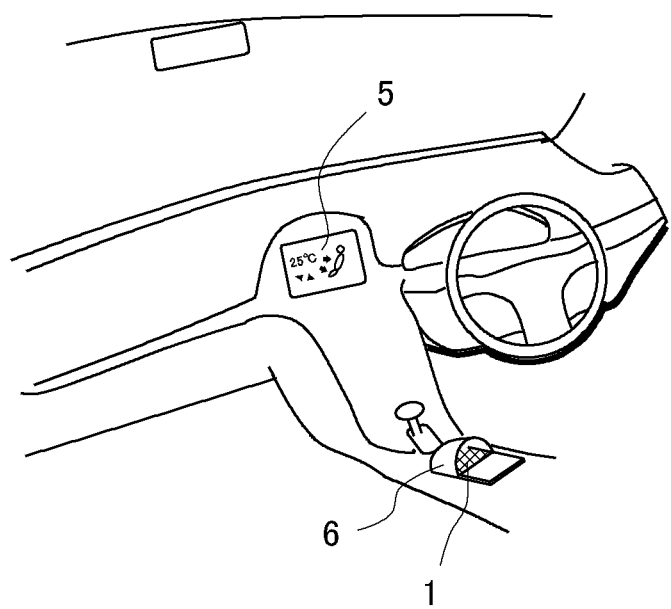
FIG. 8 is a view for describing Example of installing the input device using touch panels of the present invention in a vehicle.
Figure 9:
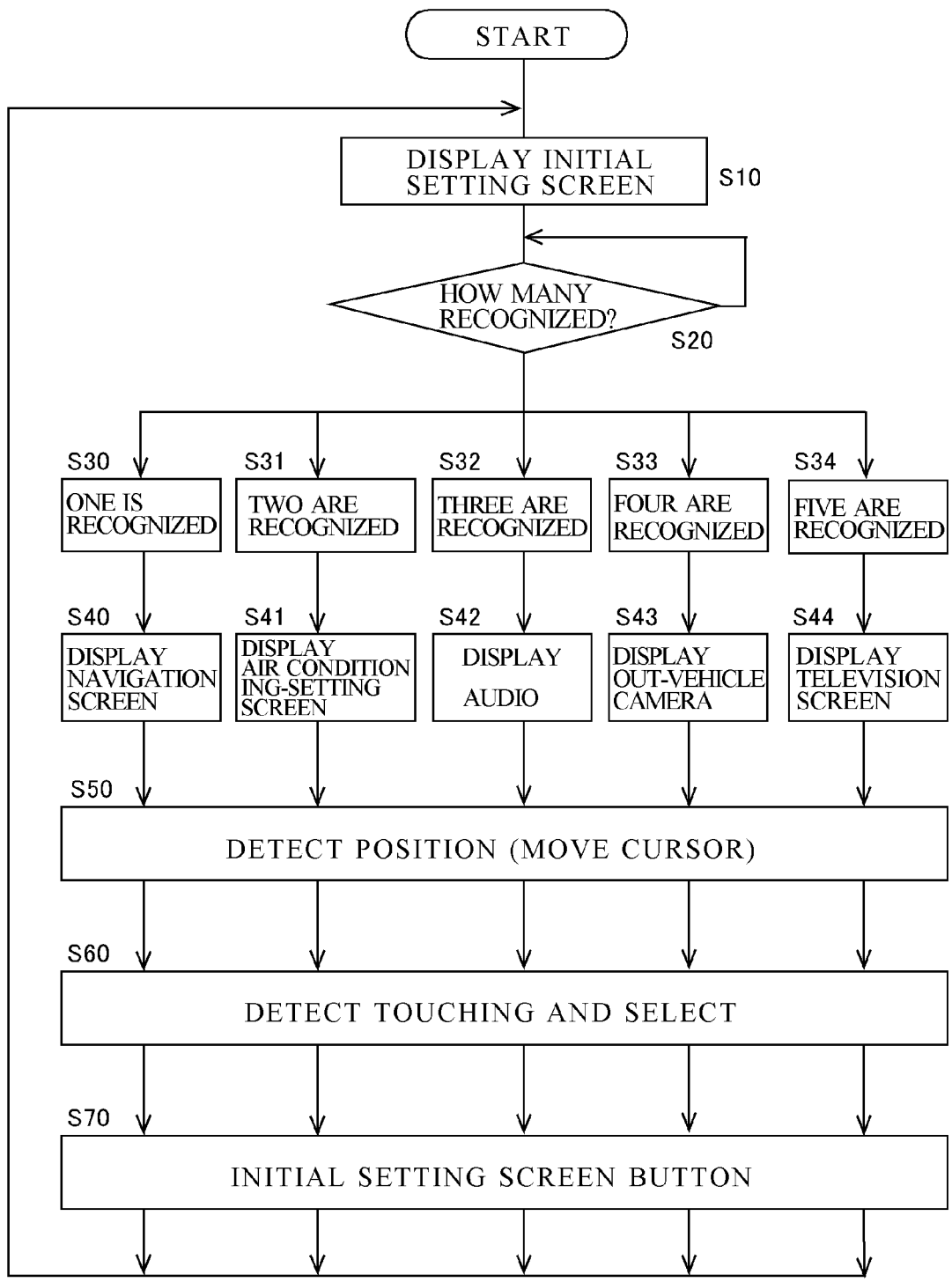
FIG. 9 is a flowchart for describing the input method performed when the input device using touch panels of the present invention is installed in a vehicle.

FIG. 8 is a view for illustrating one example of installing such an automotive navigation system in a vehicle. FIG. 9 is a flowchart for describing the input method employed for the automotive navigation system. FIG. 10 shows one example of each display mode screen of the automotive navigation system. Here, when the number of operating objects recognized is one, a navigation mode is selected; when two, an air conditioning-setting mode; when three, an audio mode; when four, an out-vehicle camera mode; and when five, a television mode.

As shown in FIG. 8, when used as an automotive navigation system, an input device 1 using touch panels is installed close to a hand of the operator and covered with a light shielding cover 6 to prevent an incidence of external light such as sunlight. Specifically, the installation on the center console allows the operator to omit a task of checking the installed position before operation, and improves the operability because the hand needs to be moved less.

A display panel 5 should be located where the operator can check without moving the sightline much. Specifically, the display panel 5 is installed on an instrument panel.

As shown in FIG. 9, when the operator starts the vehicle, the power source of input device 1 is turned on, and an initial setting screen is displayed on the display panel 5 (step S10).

Then, in order to select a display mode to be displayed, the operator forms a desired shape with an operating object, such as a hand, which is placed on a retroreflective film 31 for the recognition. An optical touch panel 3 detects reflected light from the retroreflective film 31 with light receivers 33. A microcontroller 4 distinguishes and recognizes the shape of the operating object, and generates a shape-recognition signal thereof (step S20).

Note that, in this event, step S20 is successively performed three times at 1-second intervals. By checking whether all the detected values are the same, a distinguishment from an accidental operation is made.

Specifically, when the operator places one extended finger on the retroreflective film, the number is recognized as one; when two extended fingers are placed, the number recognized is two; when three fingers extended are placed, the number recognized is three. Hence, each case is recognized differently from the others. Here, processing for each number recognized will be described.

(When One Finger is Extended)

The number recognition means in step S20 recognizes that the number recognized is one (step S30).

One of multiple screen modes is selected according to a shape-recognition signal from a microcontroller 4, and displayed on a display panel 5 (step S40).

Here, since the shape-recognition signal for one finger is generated, a navigation mode is selected and displayed.

Then, an optical touch panel 3 detects the position of an operating object, such as a finger, moved on a retroreflective film 31, and detects and inputs incident angles thereof into the microcontroller 4 to obtain the coordinates of the operating object according to the principle of triangulation. The microcontroller 4 generates a coordinate signal and transfers it to a display panel. Subsequently, a cursor 9 is moved on the display panel according to the coordinate signal, and an operation is selected (step S50).

Figure 10A:
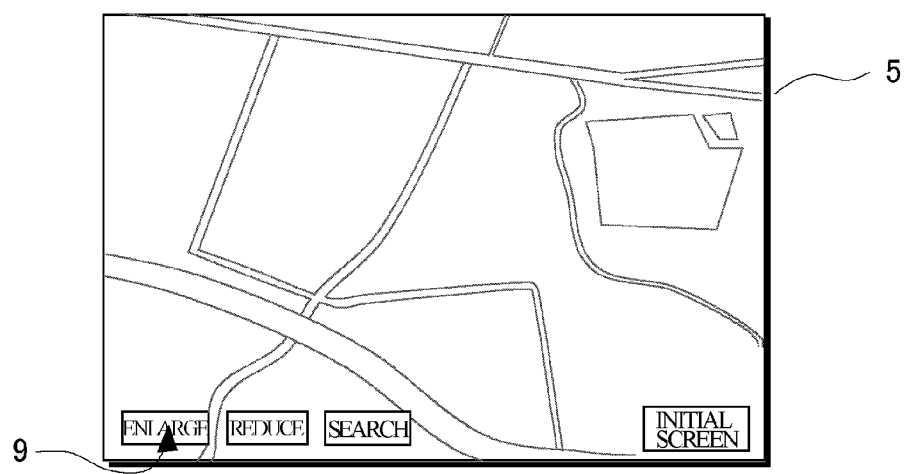
FIGS. 10A to C are drawings each for describing one example of a screen displayed by the input method for an input device of the present invention.

Specifically, the coordinate position on the retroreflective film pointed by the operator is detected, and the cursor 9 is displayed on a navigation screen of the display panel according to the coordinate signal as shown in FIG. 10A. Thereby, the operator can move the screen in a vertical or horizontal direction by moving the cursor 9 on the map, and can select a desired operation by moving the cursor 9 to the selection region among selection menus such as enlargement or reduction of the display screen, and search for destination. Incidentally, the display screen is enlarged here.

Thereafter, while the cursor 9 is on the operation selection region thus selected, the operator touches a contact touch panel 2 through the retroreflective film 31, and an affirmative signal is outputted from the microcontroller 4 for the selected operation (step S60).

Specifically, when the operator desires to enlarge the display screen, the operator moves a finger on the retroreflective film 31 to move the cursor 9 to a region of an enlarge button on the display panel as shown in FIG. 10A for the selection. Then, the screen is enlarged when the operator affirms by touching the contact touch panel 2 through the retroreflective film 31 with the cursor 9 being on the enlarge button.

Finally, in a case of switching to another display mode, an initial screen button on the display panel is selected with the cursor 9 to return to the initial setting screen, which is affirmed by touching the contact touch panel (step S70). Thereafter, the processing is returned to step S10, and the operator may form a shape with a finger for the recognition.

Incidentally, instead of the termination instruction with the button for the returning to the initial setting screen, the processing to directly return to step S10 may be executed in a case where no operation is executed for a certain period after step S60, or the operator may form a shape with a finger to be recognized by the microcontroller for a certain period to thereby perform step S10.

(When Two Fingers are Extended)

Note that, since each processing is similar to those in the above-described case of extending one finger, a specific processing flow will be described below.

The number recognition means in step S20 recognizes two fingers (step S31), and an air conditioning-setting screen is displayed on a display panel 5 (step S41).

Figure 10B:
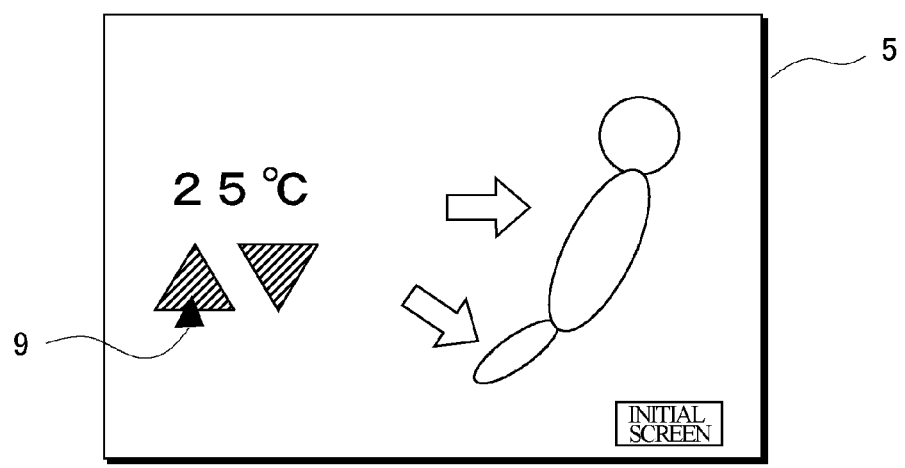

When the operator desires to increase the air conditioning temperature from 23 degrees to 25 degrees, the operator moves a finger on a retroreflective film 31 to move a cursor 9 to a region of a temperature increase button as shown in FIG. 10B for the selection (step S50), which is affirmed by touching a contact touch panel 2 through the retroreflective film 31 with the cursor 9 being on the temperature increase button (step S60). In this case, to increase the temperature by 2 degrees, the contact touch panel 2 should be touched twice.

Then, an initial screen button is touched to return to the initial setting screen, and the processing is returned to step S10 (step S70).

(When Three Fingers are Extended)

Note that as in the case of two fingers, a specific processing flow will be described below.

The number recognition means in step S20 recognizes three fingers (step S32), and an audio screen is displayed on a display panel 5 (step S42).

Figure 10C:
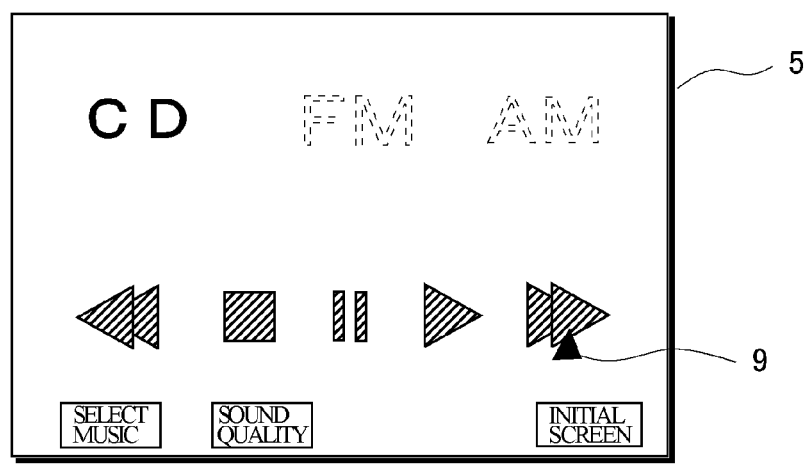

When the operator desires to skip one song, the operator moves a finger on a retroreflective film 31 to move a cursor 9 to a region of a skip button as shown in FIG. 10C for the selection (step S50), which is affirmed by touching a contact touch panel 2 once through the retroreflective film 31 with the cursor 9 being on the skip button (step S60).

Then, an initial screen button is touched to return to the initial setting screen, and the processing is returned to step S10 (step S70).

(When Four Fingers are Extended)

Note that as in the case of two fingers, a specific processing flow will be described below.

The number recognition means in step S20 recognizes four fingers (step S33), and an out-vehicle camera screen is displayed on a display panel 5 (step S43).

When the operator desires to switch to a rear camera, the operator moves a finger on a retroreflective film 31 to move a cursor 9 to a region of a rear camera-switch button for the selection (step S50), which is affirmed by touching a contact touch panel 2 once through the retroreflective film 31 with the cursor 9 being on the rear camera-switch button (step S60).

Then, an initial screen button is touched to return to the initial setting screen, and the processing is returned to step S10 (step S70).

(When Five Fingers are Extended)

Note that as in the case of two fingers, a specific processing flow will be described below.

The number recognition means in step S20 recognizes five fingers (step S34), and a television screen is displayed on a display panel 5 (step S44).

When the operator desires to change a channel, the operator moves a finger on a retroreflective film 31 to move a cursor 9 to a region of a selection button for the selection (step S50), which is affirmed by touching a contact touch panel 2 once through the retroreflective film 31 with the cursor 9 being on a desired selection button (step S60).

Then, an initial screen termination button is touched to return to the initial setting screen, and the processing is returned to step S10 (step S70).

Incidentally, when the inch size of the touch panels of an input device 1 is difference from the panel size of the display panel 5, the coordinate value on the touch panel obtained in step S50 is converted into a coordinate value of the panel size of the display panel, and a coordinate signal is generated and transferred to the display panel. In this manner, any design change can be made on the inch size of the touch panels of the input device 1 and the panel size of the display panel.

Furthermore, in Examples above, the descriptions have been given of the case where the input device 1 using touch panels is used for the automotive navigation system. Nevertheless, the input device 1 may be used as input devices for home appliances and input devices for video games.

REFERENCE SIGNS LIST 1 input device
2 contact touch panel
3 optical touch panel
4 microcontroller
5 display panel
6 light shielding cover
7 casing
8 operating object
9 cursor
21 upper substrate
22 lower substrate
23 transparent conductive film
24 adhesive
31 retroreflective film
32 light emitter
33 light receiver
34 detector

The invention claimed is:

1. An input device using touch panels comprising:
   a contact touch panel; and
   an optical touch panel including
      a retroreflective film provided to cover a surface of the contact touch panel, and
      a pair of detectors each constituted of a light emitter and a light receiver and respectively located above both ends of one side of the contact touch panel, wherein
   an operating object placed on the retroreflective film is irradiated with light from the light emitters obliquely thereabove, the light receivers detect reflected light from the retroreflective film exposed at the operating object, and a shape of the operating object is distinguished and recognized,
   the pair of detectors detect incident angles at a position of said operating object moved on the retroreflective film to obtain coordinates of the operating object according to a principle of triangulation, and
   input information is affirmed by touching the contact touch panel.

2. The input device using touch panels according to claim 1, wherein
   the contact touch panel and the optical touch panel are covered with a light shielding cover, and
   the operating object is placed through an opening provided on one side of the light shielding cover.

3. The input device using touch panels according to claim 1, wherein any one of a resistive film type touch panel and a capacitive touch panel is used as the contact touch panel.

4. The input device using touch panels according to claim 1, wherein
   a light emitting diode is used as the light emitters of the pair of detectors of the optical touch panel, and
   a CMOS sensor is used as the light receivers.

5. The input device using touch panels according to claim 1, wherein said operating object is a hand, a portion of a hand, or a hand-held object.

6. The input device using touch panels according to claim 5, wherein said operating object is at least one finger.

7. An input method for an input device using touch panels comprising: a contact touch panel; and an optical touch panel including a retroreflective film provided to cover a surface of the contact touch panel, and a pair of detectors each constituted of a light emitter and a light receiver and respectively located above both ends of one side of the contact touch panel, the input device used for inputting by operating a cursor displayed on a display panel provided at a position apart from the input device, the input method comprising:

irradiating an operating object placed on the retroreflective film with light from the light emitters of the optical touch panel obliquely thereabove, causing the light receivers to detect reflected light from the retroreflective film exposed at the operating object, causing a microcontroller to distinguish a shape of the operating object, and selecting one of a plurality of display modes displayed on the display panel according to a shape-recognition signal from the microcontroller;

next, in the selected display mode, causing the pair of detectors to detect incident angles at a position of said operating object moved on the retroreflective film of the optical touch panel, and to input the incident angles into the microcontroller to obtain coordinates of the operating object according to a principle of triangulation, transferring a coordinate signal to the display panel, and moving the cursor to an operation selection region on the display panel according to the coordinate signal; and touching the contact touch panel at a position of the cursor in the selected operation selection region to thereby output an affirmative signal from the microcontroller for operation of the selected display mode.

8. The input method for an input device using touch panels according to claim 7, wherein the shape of the operating object is distinguished by a number of fingers, and one of a plurality of display modes displayed on the display panel is selected according to the shape-recognition signal from the microcontroller.

9. The input method for an input device using touch panels according to claim 7, wherein said operating object is a hand, a portion of a hand, or a hand-held object.

10. The input device using touch panels according to claim 9, wherein said operating object is at least one finger.

* * * * *